UNITED STATES PATENT OFFICE.

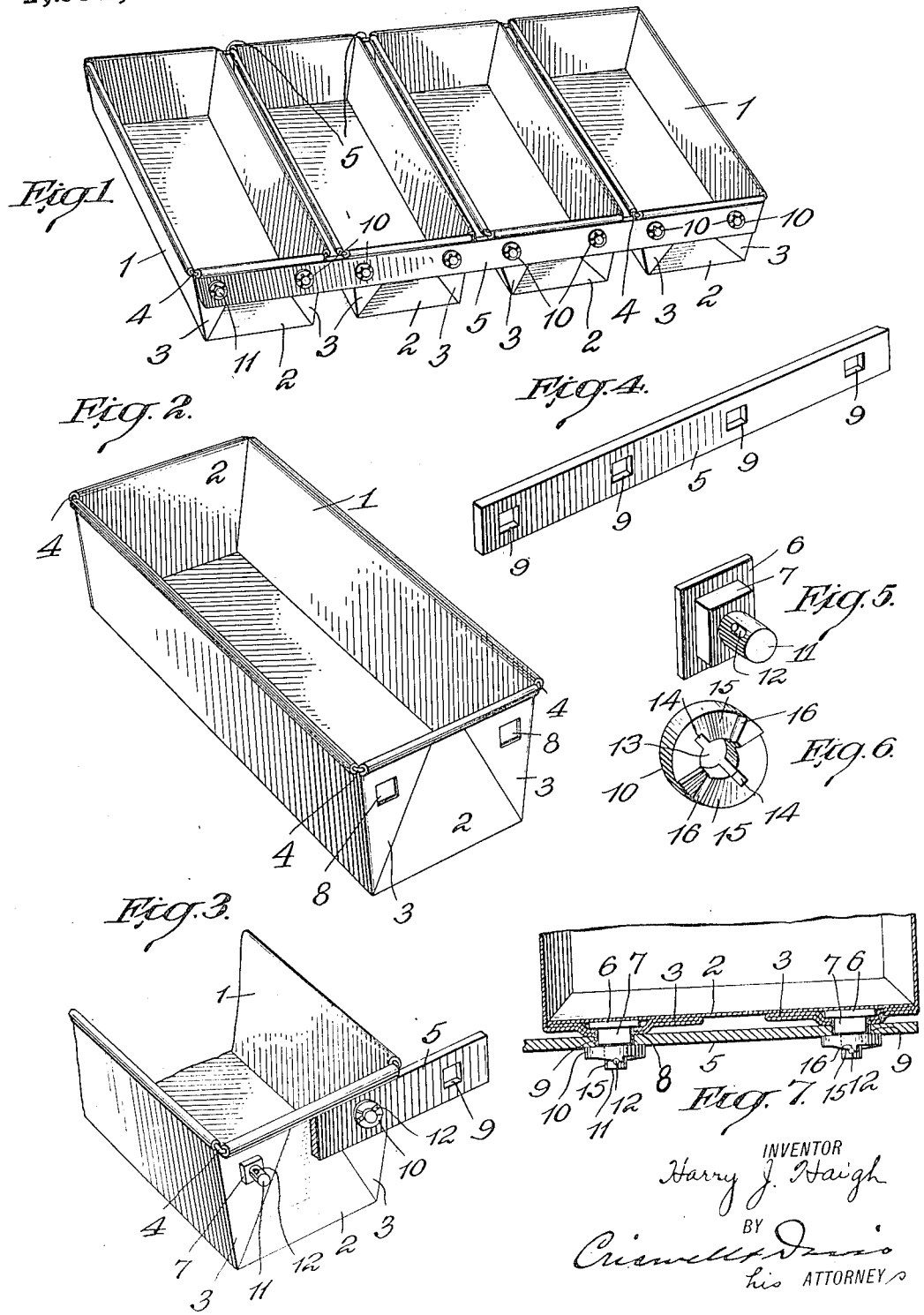

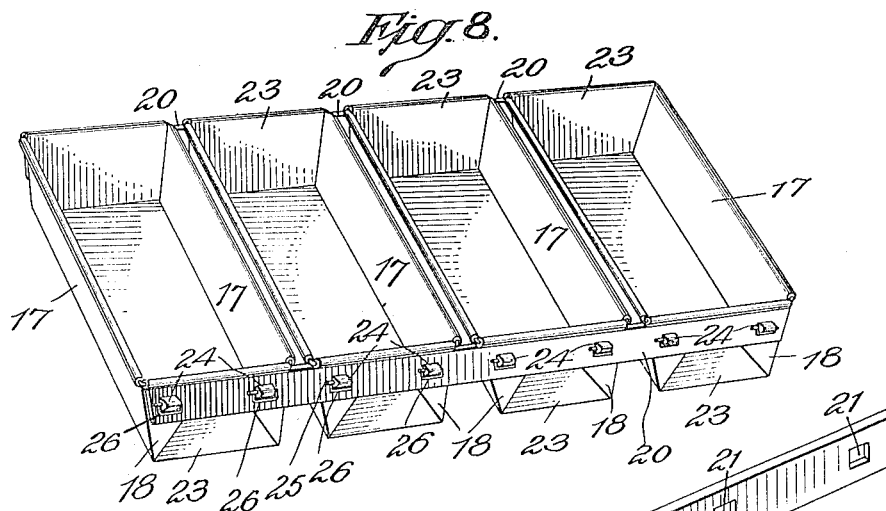
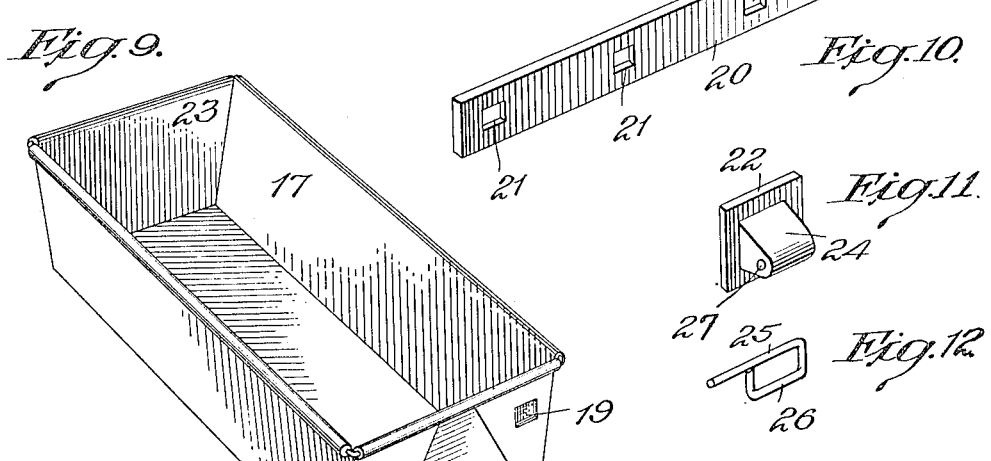
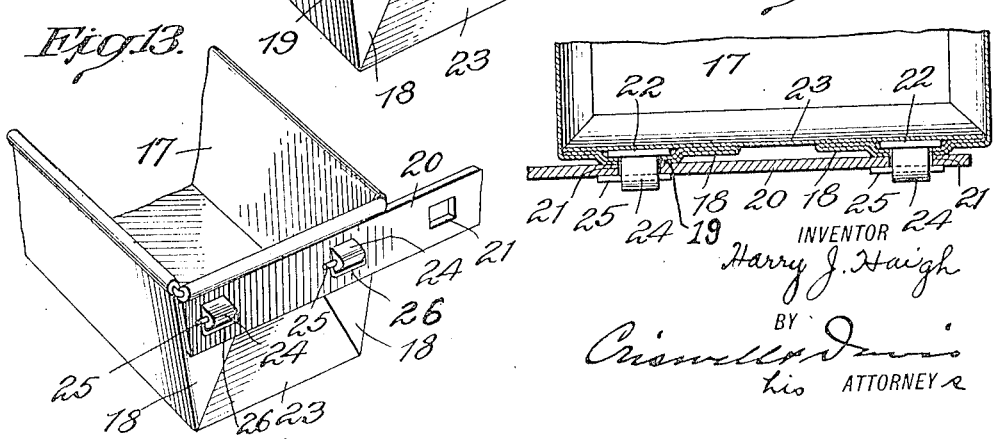

HARRY J. HAIGH, OF NEW YORK, N. Y.

BAKING-PAN.

1,291,491.      Specification of Letters Patent.      Patented Jan. 14, 1919.

Application filed September 22, 1917, Serial No. 192,736. Renewed November 19, 1918. Serial No. 263,234.

*To all whom it may concern:*

Be it known that I, HARRY J. HAIGH, a citizen of the United States, and a resident of Stapleton, county of Richmond, city and State of New York, have invented certain new and useful Improvements in Baking-Pans, of which the following is a specification.

This invention relates to that class of baking pans in which a plurality of individual pans are connected together to form a multiple pan or a set of pans adapted to be handled as a unit, and it is especially applicable to baking pans for use in bakeries, where the pans must be rigidly held together to withstand severe usage. Features of the invention common to this application and my copending application Serial No. 192,735, filed September 22, 1917, not claimed herein, form the subject matter of generic claims presented in said copending application.

One object of the invention is to provide simple means for detachably connecting the individual pans together, whereby a damaged or worn pan may be removed from the set and a new pan substituted therefor, or the relative positions of the pans of a set changed to present a different pan or pan surface at the point or points of greatest wear.

Another object of the invention is to provide simple, light, and inexpensive means for detachably holding the individual pans in spaced relation, so that a free circulation of heated air between the pans will be permitted, the connecting means being so constructed that the use of rivets or other fastening devices projecting within the pans is avoided, thus eliminating the unsanitary conditions resulting from the presence of rivet heads or other projections on the interior of the pans, and avoiding the formation of marks on the articles baked in the pans.

A further important object of the invention is to provide a knock-down multiple pan in which the individual pans are of standard construction and are adapted to be detachably and interchangeably connected together by a standard form of connecting means.

Another important object of the invention is to provide a standard form of individual pan having a pair of lugs or connecting devices rigidly and permanently supported at each end thereof by the corner folds of the pan, which lugs or connecting devices are adapted to form separable connections between the pans and a standard form of connecting bar.

In the drawings, Figure 1 is a perspective view of a multiple baking pan illustrating one embodiment of the invention;

Fig. 2 a perspective view of one of the individual pans, with the lugs or connecting devices removed;

Fig. 3 a fragmentary perspective view of one of the individual pans, showing one of the connecting bars attached to the pan, a portion of the bar being broken away to show the manner of supporting the lugs or connecting devices on the corner folds of the pans;

Fig. 4 a fragmentary perspective view of one of the connecting bars;

Fig. 5 a detail perspective view of one of the lugs or connecting devices;

Fig. 6 a detail perspective view of one of the rotary disks or heads for detachably locking the connecting bars to the lugs;

Fig. 7 a fragmentary horizontal sectional view of one of the pans, showing one of the connecting bars attached thereto;

Fig. 8 a view similar to Fig. 1, showing a modified form of multiple pan.

Fig. 9 a view similar to Fig. 2, showing the form of individual pan employed in the modified construction of multiple pan shown in Fig. 8;

Fig. 10 is a fragmentary perspective view of the form of connecting bar employed in the modified form of multiple pan;

Fig. 11 a perspective view of one of the lugs or connecting devices employed in the construction shown in Fig. 8;

Fig. 12 a detail view showing one of the locking pins for detachably holding the connecting bars to the lugs in the form of pan shown in Fig. 8;

Fig. 13 a fragmentary perspective view of the modified form of pan; and

Fig. 14 a fragmentary horizontal sectional view of one of the pans employed in the modified construction shown in Fig. 8, showing one of the connecting bars attached thereto.

The individual pans 1, with the exception of the lugs or connecting devices and the manner of connecting the lugs with the pans, are well-known constructions. These pans are pressed from a sheet metal blank, and the surplus metal at the corners of the pan is bent flatly against the end walls 2, forming substantially V-shaped corner folds 3, at each side of the end walls of the pan. The pans are each provided with a beaded upper edge formed by bending the edges of the side and end walls outwardly and downwardly around a rectangular wire reinforcing frame 4.

The individual pans 1 are arranged side by side in spaced relation, and are rigidly and detachably connected together by a pair of connecting bars 5, which extend along the end walls of the series of individual pans at opposite sides of the multiple pan. To connect the pans 1 to the bars 5 and hold the pans against relative movement toward or from each other, each of the pans 1 is provided with a pair of lugs or connecting devices at each end thereof. These lugs or connecting devices are permanently supported at the ends of the pans by the corner folds 3. Each lug comprises a flat base part 6, which is confined between the outer side of the end wall 2 and the inner side of the corner fold 3, and is formed with a reduced rectangular projecting portion 7 which projects outwardly through a rectangular aperture 8 in the corner folds 3, and is adapted to engage in one of the rectangular apertures 9 in the connecting bar 5. The rectangular portions 7 of the lugs serve to hold the pans against relative vertical movement and against movement toward or from each other. The connecting bars 5 are detachably held in place by means of rotary locking disks or heads 10 detachably held on the cylindrical shanks or stems 11 of the lugs in the outer ends of which are fixed transversely extending retaining pins 12. Each of the locking disks 10 is formed with a central aperture 13 formed with outwardly extending slots 14 in opposite sides thereof to permit the disk 10 to be passed on to the shank 11 beyond the transversely extending retaining pin 12. After the disk 10 has been moved inwardly beyond the retaining pin 12, the disk is rotated in a counter-clockwise direction causing the oppositely disposed cam surfaces 15 formed on the outer face of the disk to pass under the projecting ends of the pin 12, until the ends of the pin snap into grooves 16 formed adjacent the highest points of the cam surfaces. The engagement of the cam surfaces 15 with the projecting ends of the pins 12 forces the connecting bars 5 inwardly into close engagement with the corner folds, as shown in Fig. 7, thus insuring a very rigid connection between the bars 5 and the ends of the pans. It will be understood that the squared portions 7 of the shanks of the lugs are of such length that the outer ends thereof do not project beyond the outer sides of the connecting bars 5, but are adapted to terminate flush with or slightly short of the outer surface of the bars 5, after the same have been tightly locked in place in the manner above described, by means of the locking disks 10, as shown more clearly in Fig. 7. It will also be seen that when the ends of the locking pins 12 snap into the grooves 16 on the cam surfaces 15, the disks 10 will be securely held against accidental rotation and disconnection from the lugs, while at the same time the disks may be readily rotated by means of a wrench or otherwise, to force the ends of the pins out of the grooves 16 and may be readily removed from the lugs by rotating the disk until the slots 14 therein register with the projecting ends of the pins 12.

In the modified construction shown in Figs. 8 to 14, the individual pans 17 are of the same construction as the pans 1 heretofore described, except that the corner folds 18 are formed with elongated rectangular apertures 19, instead of square apertures. The individual pans are rigidly held together in spaced relation by means of two connecting bars 20, which extend along the end walls of the individual pans at opposite sides of the multiple pan, and are provided with a series of elongated rectangular apertures 21, adapted to register with the elongated apertures 19 in the corner folds 18 of the pans 17.

Each of the pans 17 is provided at each end thereof with a pair of lugs or connecting devices, each of which lugs is rigidly and permanently supported by one of the corner folds 18. Each of the lugs or connecting devices comprises a flat base portion 22, which is confined between the outer surface of the end wall 23 of the pan and the inner side of the corner fold 18, and an elongated outwardly projecting portion 24 which projects outwardly through the elongated aperture 19 in the corner fold 18 and through the registering aperture 21 in the connecting bar 20. The connecting bars are locked in place by means of locking pins or devices 25, which are preferably formed of spring wire and are adapted to be passed through horizontally extending apertures 27 in the outer ends of the projecting portions 24 of the lugs. To prevent accidental loss of the pins 25 each of the pins is preferably formed with a rectangular looped portion 26 adapted to extend about the outer side of the projecting portion 24.

While I have shown four pans connected together to form a set, it will be obvious that any desired number of pans may be connected together.

From the foregoing it will be observed that simple, light, and inexpensive means has been provided for rigidly and detachably holding a series of pans in spaced relation so that an even circulation of heat about the pans is permitted; that a worn or damaged pan may be readily removed and a new pan substituted therefor, or the relative positions of the pans changed to present a different pan at the point of greatest wear; that the connecting devices are so constructed that the use of rivets or other fastening devices projecting within the pans is avoided; and that the individual pans and the connecting devices are of standard construction and are interchangeable.

What I claim is:

1. A multiple baking pan comprising a plurality of individual pans, having corner folds lying against the end walls thereof, an independent lug held to each of said corner folds, and means detachably held to said lugs for connecting the pans together.

2. A multiple baking pan comprising a plurality of individual pans having corner folds lying against the end walls thereof, pan-connecting members extending along the end walls of the pans, a pair of independent outwardly projecting lugs permanently held to each end of each pan by the corner folds, and means for detachably holding the pan-connecting members to said lugs.

3. The combination of a series of pans arranged in juxtaposition and having corner folds lying against the exterior thereof, each of which is formed with an aperture, connecting bars extending along opposite sides of the series of pans and formed with a series of apertures registering with the apertures in the corner folds, a series of independent lugs having projecting portions extending through the registering apertures in the corner folds and connecting bars and each having a head confined between the inner side of one of the corner folds and the adjacent wall of the pan, and means for detachably holding the connecting bars on said lugs.

4. The combination of a series of rectangular pans arranged side by side and having corner folds lying against the end walls thereof, each of which is formed with an aperture, connecting bars extending along the end walls of the pans and formed with apertures registering with the apertures in the corner folds, and an independent separable fastening device held to each of said corner folds, having a shank portion extending through the registering apertures in the corner fold and connecting bar.

5. The combination of a series of rectangular pans arranged side by side and having corner folds lying against the end walls thereof, connecting bars extending along the end walls of the pans, and an independent separable fastening device held to each of the corner folds for detachably holding the connecting bars to the pan.

6. The combination of a series of rectangular pans arranged side by side in spaced relation and having corner folds lying against the end walls thereof formed with apertures, connecting bars extending along the end walls of the pans and formed with apertures registering with the apertures in the corner folds, and independent separable fastening devices extending through the registering apertures in the connecting bars and corner folds for rigidly and detachably holding the pans in spaced relation.

7. The combination of a series of rectangular pans arranged side by side in spaced relation and having corner folds lying against the end walls thereof formed with apertures, connecting bars extending along the end walls of the pans and formed with apertures registering with the apertures in the corner folds, lugs formed with shanks extending through the registering apertures in the connecting bars and corner folds, and having heads confined between the end walls of the pans and the corner folds, the shanks of said lugs being formed with transversely extending projections at opposite sides thereof, and rotary locking members removably held on the shanks of said lugs and formed with oppositely disposed cam surfaces on the outer faces thereof adapted to engage under the projecting portions on the shanks of the lugs.

8. The combination of a series of rectangular pans arranged side by side and having corner folds arranged in pairs at opposite sides thereof and lying against the outer sides of the pans, connecting members extending along opposite sides of the series of pans, projecting devices held to the pans by the corner folds and extending through apertures in the connecting members, and locking devices detachably held on said projecting devices and rotatable thereon adapted to force the connecting members inwardly and detachably hold said members tightly against the corner folds of the pans.

9. The combination of a series of rectangular pans arranged side by side in spaced relation and having corner folds lying against the end walls thereof, connecting members extending along the end walls of the series of pans, projecting devices held to the end walls of the pans by the corner folds and extending through apertures in the connecting members, and removable rotary locking devices coöperating with said projecting devices to detachably hold the connecting members in close engagement with the ends of the pans.

10. The combination of a series of rectangular pans arranged side by side in spaced relation and having corner folds disposed in pairs at opposite sides thereof and lying against the outer sides of the pans, connecting members extending along opposite sides of the series of pans, independent projecting devices held to the exterior of the pans by each of the corner folds and extending through apertures in the connecting members, and means removably held to the outer ends of said projecting devices for detachably holding the connecting members in place.

This specification signed this 20th day of September A. D. 1917.

HARRY J. HAIGH.